(12) United States Patent
Williams

(10) Patent No.: US 11,465,702 B2
(45) Date of Patent: Oct. 11, 2022

(54) STORAGE STAND

(71) Applicant: Marty Williams, Colorado Springs, CO (US)

(72) Inventor: Marty Williams, Colorado Springs, CO (US)

( * ) Notice: Subject to any disclaimer, the term of this patent is extended or adjusted under 35 U.S.C. 154(b) by 0 days.

(21) Appl. No.: 16/833,407

(22) Filed: Mar. 27, 2020

(65) Prior Publication Data
US 2020/0307728 A1    Oct. 1, 2020

Related U.S. Application Data

(60) Provisional application No. 62/824,802, filed on Mar. 27, 2019.

(51) Int. Cl.
*B62H 3/04*    (2006.01)
*B25H 3/04*    (2006.01)
*F16M 11/42*   (2006.01)
*F16M 11/04*   (2006.01)

(52) U.S. Cl.
CPC .................. *B62H 3/04* (2013.01); *B25H 3/04* (2013.01); *F16M 11/041* (2013.01); *F16M 11/42* (2013.01); *F16M 2200/08* (2013.01)

(58) Field of Classification Search
CPC ... B62H 3/04; B62H 3/08; B62H 3/12; B62H 3/02; B62H 3/10; B25H 3/04; F16M 11/041; F16M 11/28; F16M 11/42; F16M 2200/08; Y10T 70/5872; Y10T 70/5876; Y10T 70/5881; G07F 17/00
USPC ...... 248/125.8, 121, 125.1, 125.9, 127, 370, 248/158, 161, 146, 150, 151, 154, 163.1, 248/157, 163.2, 432, 165, 435, 168, 170, 248/172, 440.1, 188.7, 188.5, 188.1, 188
See application file for complete search history.

(56) References Cited

U.S. PATENT DOCUMENTS

| | | | | |
|---|---|---|---|---|
| 559,312 A | * | 4/1896 | Seely | B62H 3/06 211/22 |
| 588,291 A | * | 8/1897 | Porter | B62H 3/00 211/22 |
| 594,627 A | * | 11/1897 | Hewlett | B25H 1/0014 211/22 |
| 605,429 A | * | 6/1898 | Howard | B62H 3/00 211/22 |
| 1,832,775 A | * | 11/1931 | Hallowell | G09F 1/12 40/611.05 |
| 4,036,462 A | * | 7/1977 | Sheftel | G10G 5/00 248/166 |
| 4,183,511 A | * | 1/1980 | Marek | B66C 23/48 254/100 |
| 5,149,174 A | * | 9/1992 | Charash | A47C 9/005 248/125.1 |

(Continued)

*Primary Examiner* — Nkeisha Smith
(74) *Attorney, Agent, or Firm* — Apex Juris, pllc; Tracy M. Heims

(57) ABSTRACT

A storage stand having a base with a main tube having a first end, a middle portion and a second end with at least one wing receiver affixable to the main tube, a pair of outer stand tubes each having a first end, a middle portion and a second end; a pair of leg connectors to connect the main tube first and second ends to the middle portions of the pair of outer stand tubes; feet located at each of the outer stand tubes first and second ends; at least one wing secureable to the at least one wing receiver; and at least one payload carrying member affixable to the at least one wing.

20 Claims, 19 Drawing Sheets

(56) References Cited

U.S. PATENT DOCUMENTS

| | | | | |
|---|---|---|---|---|
| 5,320,227 | A * | 6/1994 | Minoura | B62H 3/00 211/22 |
| 5,460,343 | A * | 10/1995 | Hestilow | A63B 69/201 248/121 |
| 5,632,458 | A * | 5/1997 | Tollerud | A47G 29/10 248/121 |
| 5,772,048 | A * | 6/1998 | Sopcisak | B62H 3/00 211/196 |
| 6,158,701 | A * | 12/2000 | Deshler | B05B 13/0285 248/125.1 |
| 6,182,836 | B1 * | 2/2001 | Gutierrez | A47F 7/04 211/22 |
| 6,220,459 | B1 * | 4/2001 | Runyon | A47F 7/00 211/195 |
| 6,371,309 | B1 * | 4/2002 | Smith | B62H 3/12 211/17 |
| 6,409,128 | B1 * | 6/2002 | Deshler | B05B 13/0285 248/125.1 |
| 6,837,934 | B1 * | 1/2005 | Patrykus | B05B 13/0285 118/500 |
| 6,843,380 | B1 * | 1/2005 | Fickett | B62H 3/12 211/17 |
| 7,448,606 | B1 * | 11/2008 | Johnson | B05B 13/0285 269/16 |
| 8,328,173 | B1 * | 12/2012 | DesForge | B25H 1/0007 269/71 |
| 8,770,561 | B2 * | 7/2014 | Gagnon, Jr. | B25H 1/0007 269/9 |
| 9,073,492 | B1 * | 7/2015 | Shen | B62H 3/04 |
| 9,340,245 | B2 * | 5/2016 | Kerman | A47B 57/34 |
| 9,377,153 | B2 * | 6/2016 | Zhang | F16M 11/42 |
| 9,650,092 | B1 * | 5/2017 | Tsai | B62H 3/06 |
| 9,984,667 | B2 * | 5/2018 | Walker | F16M 11/041 |
| 10,253,923 | B2 * | 4/2019 | Heckler | F16M 11/42 |
| 10,322,430 | B2 * | 6/2019 | Miller | B05B 13/0271 |
| 10,641,301 | B2 * | 5/2020 | Woelfling | F16B 2/065 |
| 10,744,526 | B2 * | 8/2020 | Johnson | B25H 1/0007 |
| 10,829,172 | B2 * | 11/2020 | Szordykowski | B25B 1/22 |
| 10,906,473 | B1 * | 2/2021 | Yu | B60R 9/06 |
| 11,008,060 | B1 * | 5/2021 | Liu | B62H 3/02 |
| 2005/0224665 | A1 * | 10/2005 | Cassavar | F16M 11/22 248/146 |
| 2009/0045015 | A1 * | 2/2009 | Anstead | B66F 9/06 187/244 |
| 2011/0215208 | A1 * | 9/2011 | Campagna | G10G 5/00 248/158 |
| 2012/0043286 | A1 * | 2/2012 | Noyes | B62H 3/12 211/22 |
| 2013/0175414 | A1 * | 7/2013 | Nelson | F16M 11/00 248/158 |
| 2015/0083769 | A1 * | 3/2015 | Williams | B60R 9/06 224/488 |
| 2015/0360739 | A1 * | 12/2015 | Ashlag | B62H 5/005 29/426.2 |
| 2020/0031289 | A1 * | 1/2020 | Williams | B60R 9/045 |
| 2021/0147018 | A1 * | 5/2021 | Jones | B60D 1/065 |

* cited by examiner

STORAGE STAND

CROSS-REFERENCE TO RELATED APPLICATIONS

This application claims priority to previously filed U.S. Provisional Patent Application No. 62/824,802 filed on Mar. 27, 2019.

BACKGROUND OF THE INVENTION

Field of the Invention

The present invention addresses new methods of storing tools, sporting goods, ski's, bicycles and related equipment typically found in a home, an apartment, a condo, other living spaces, a garage, a storage shed, or other home or commercial storage space.

Description of the Prior Art

Conventional storage devices involve attaching equipment and tool storage components to an interior or exterior wall, onto which tools and related sporting goods are attached. These attachments are hooks, clamps, nails, hangers and any of a variety of attachment apparatus the need to be secured to walls or solid members. Alternatively, these storage type devices can be hung from ceilings or rafters. In either case though they are fixed in place and are thus not moveable. The present invention permits a moveable, free-standing storage device.

It should be appreciated that all combinations of the concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

SUMMARY OF THE INVENTION

The present invention is a storage stand having a base plate, at least one foot connected to a bottom of the base plate, at least one receiver on a top of the base plate, at least one arm connectable to the receiver, and at least one connector affixable to the at least one arm, all designed to carry and hold payloads, such as bicycles, equipment or gear.

The present invention utilizes a rolling base assembly onto which one or more upwardly angled storage arms are attach. The storage arms can be used independently or in unison with each other in order to store tools and equipment oriented either horizontally, vertically or at other angles. The present invention uses various attachment devices that provide an intermediate connection between the storage arms and the goods being stored.

The present invention uses upwardly angled arms that when installed on the base of the stand, generally form a V shape above the stand base. This V shape is novel among existing storage designs and allows for a wide variety of goods to be carried on the stand. Examples of these goods are typically seen hanging from or leaning against a house or garage wall, and include: racks, shovels, trimmers, poles, skis, snowboards, bicycles, fishing rods, ladders and related tools, sporting goods, yard equipment and tools, just to name a few.

The technique of suspendably attaching common tools and sporting goods to the stand provides for the compact and mobile storage system abilities versus conventional wall or ceiling mounted racks which require drilling holes at located load bearing wall or roof surfaces onto which a conventional storage device is mechanically attached. In contrast, the present invention is free standing and mobile and allows storage on both sides of the stand.

DETAILED DESCRIPTION OF THE INVENTION

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, various examples of the storage stand and their configurations are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature or example.

The invention will now be described in detail with reference to the attached drawings. Referring now to the invention in more detail, in FIGS. 1 through 17 there are shown several views of the present invention. In further detail, referring to an example of the invention in FIG. 5 is a first embodiment of the present invention having a base, casters connected to the base, a pair of matching receivers protruding from the base and wings inserted into each of the receivers.

Figure 5:
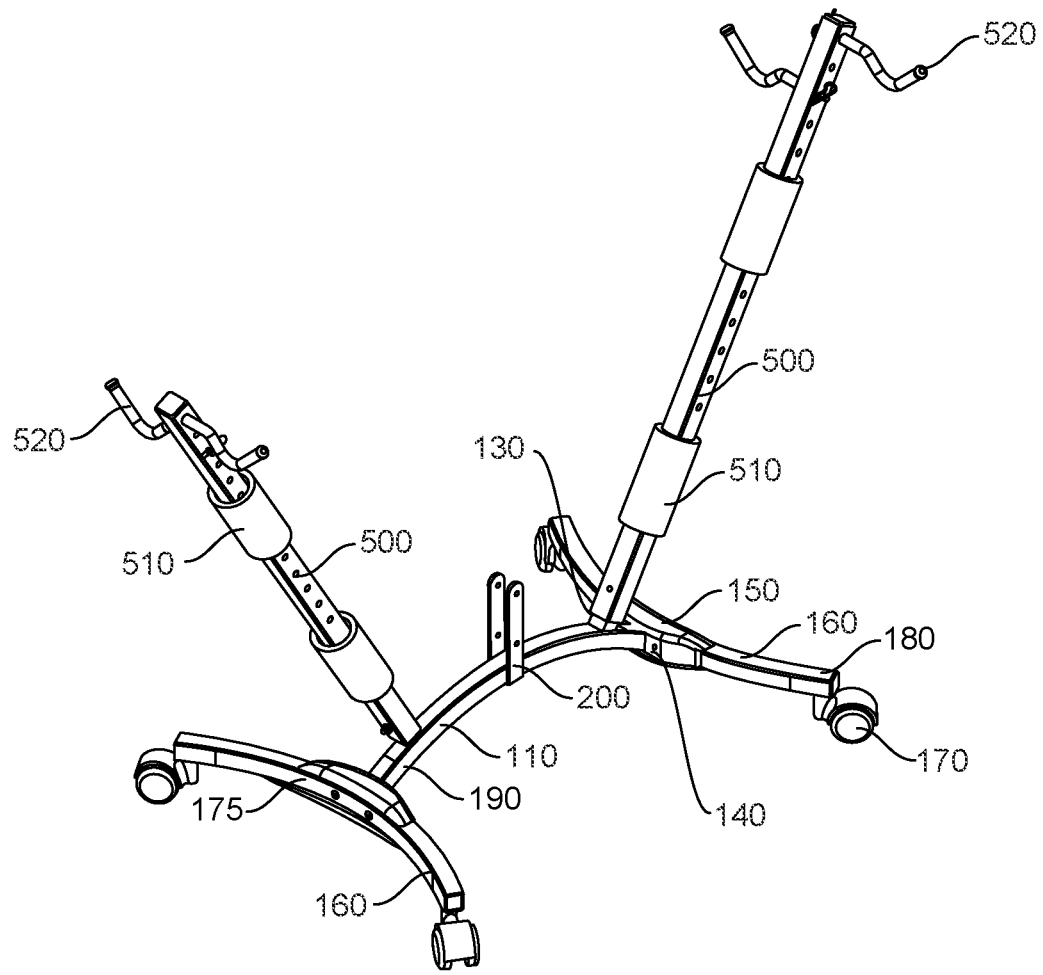
FIG. 5 is another view of the base with the wings attached.

Specifically, as shown in FIG. 5, the present invention defines a storage stand 10 having a base with a main tube 110 having a first end 111, a middle portion 112 and a second end 113 with at least one wing receiver 130 affixable to the main tube 110, a pair of outer stand tubes 160 each having a first end 175, a middle portion 190 and a second end 180; a pair of leg connectors 140 to connect the main tube first and second ends 111, 113 to the middle portions of the pair of outer stand tubes 490160; feet 170 located at each of the outer stand tubes first and second ends 175, 180; at least one wing 500 secureable to the at least one wing receiver 130; and at least one payload carrying member 520 affixable to the at least one wing 500.

Figure 2:
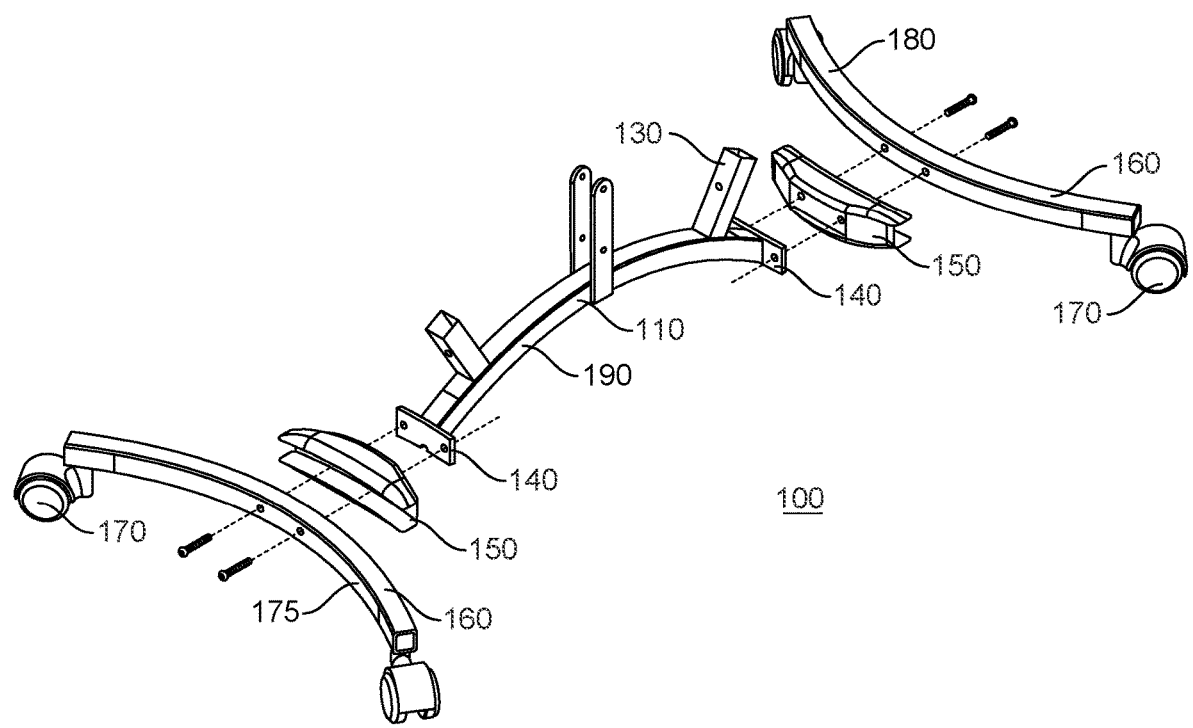
FIG. 2 is a elevated, exploded view of the structure of FIG. 1 showing the component parts for the base.

This is the most basic version of the storage stand. The base unit itself is shown in an exploded view in FIG. 2. In this image the main tube 110 is seen with two wing receivers 130 attached, each being attached somewhere between the middle portion 112 and each the first end 111 and second end 113. In FIG. 2 the main tube 110 forms a slight arc but the tube could be straight or triangular or some other shape. In this embodiment the top of the arc has the receivers affixed thereto. These receivers 130 can be welded to the main tube 110 or they can be affixed using screws, bolts, or any other means as long as it creates a secure connection. At the ends 111, 113 of the main tube 110 there is a leg connector 140. The leg connector is a plate that is typically welded or fused to the ends. This leg connector 140 can be connected directly to the outer stand tube 160 by using fasteners of some type, such as bolts, screws, or some other fastener. The parts could be welded or permanently affixed one to the other thus forming one solid member. In addition, there could be a leg length adjuster 141 that can adjust the distance between the main tube 110 and the outer stand tubes 160. In this embodiment the amount of adjustment varies between ½" and 1".

Figure 6:
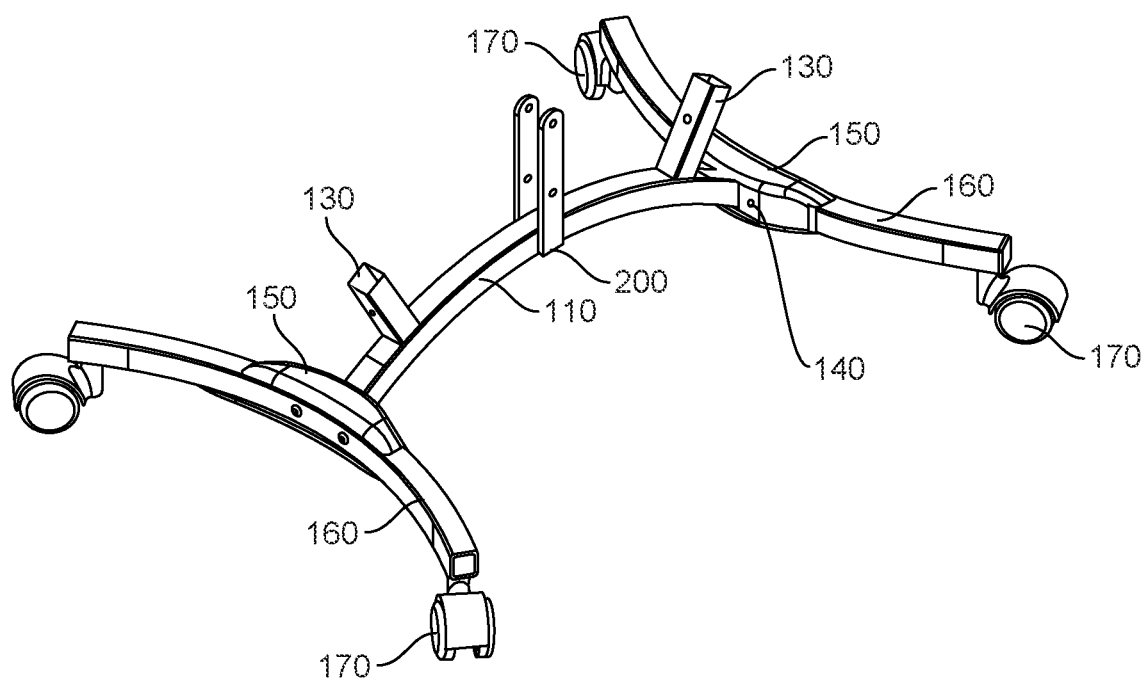
FIG. 6 is a elevated view of the base of the apparatus.

FIG. 6 shows the entire base unit fully assembled. In this FIG. the feet are casters that allow for the entire unit to easily move from one place to another. These casters can be lockable to prevent the unit from movement once in place. These feet do not have to be casters. They could be rollers of some other type or they could simply be immovable feet that securely hold the unit in one place. Casters are preferred however as they allow the unit more versatility.

The wing receivers 130 as shown in FIGS. 2 and 6 are permanently affixed to the main tube 110 at a set position. However, these receivers 130 can be moveable and adjustable along the main tube 110 by using a different type of connection means.

FIG. 5 shows the base unit with two wing receivers 130 and with a wing 500 attached to each of the wing receivers. When affixed to the wing receivers 130 the wings 500 project upward and outwardly from the main tube 110. Due to the curved shape of the main tube the wings 500 extend outwardly at a slight angle, thus causing the two wings 500 to form a wide V shape. If the main tube is straight the wings would come off either perpendicularly or would have to have a flat bottom with an angular configuration if the V shape is desired. The V shape is desired as it creates a wider connection base at the top but keeps a smaller footprint at the bottom.

Figure 11:
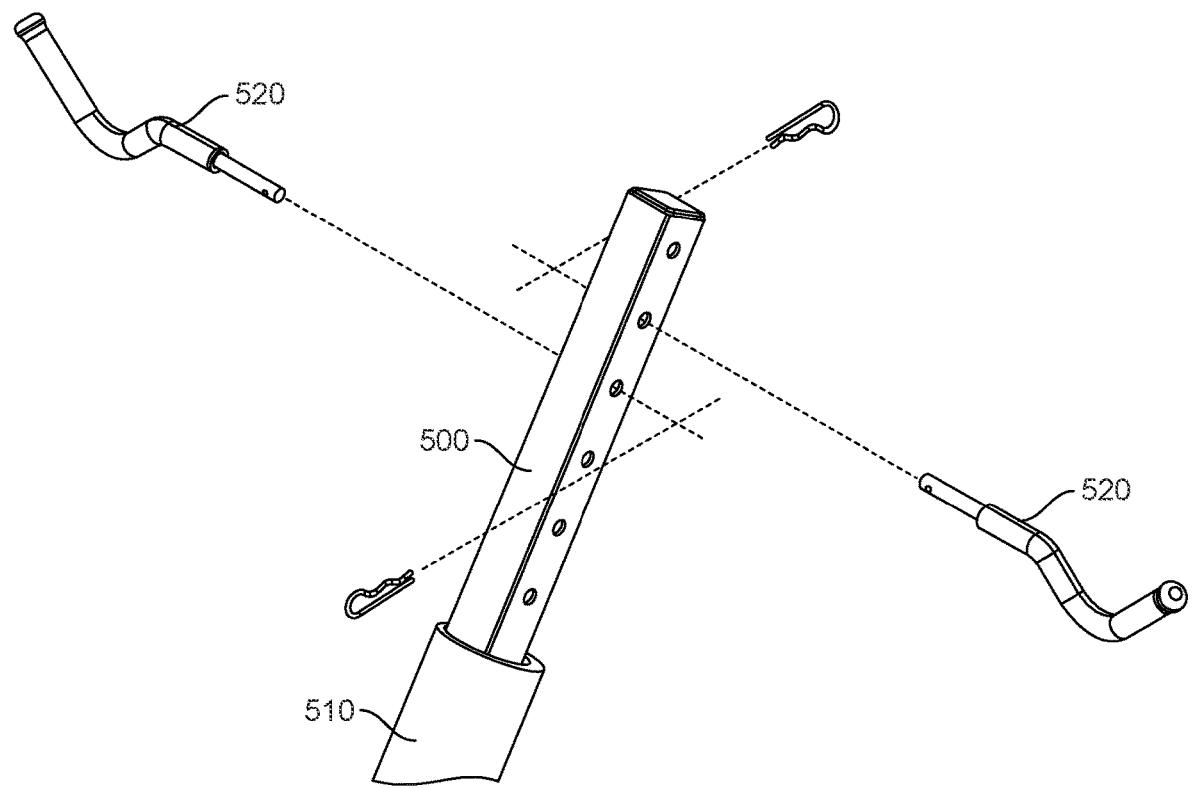
FIG. 11 is a view of the cradles and clips.
Figure 12:
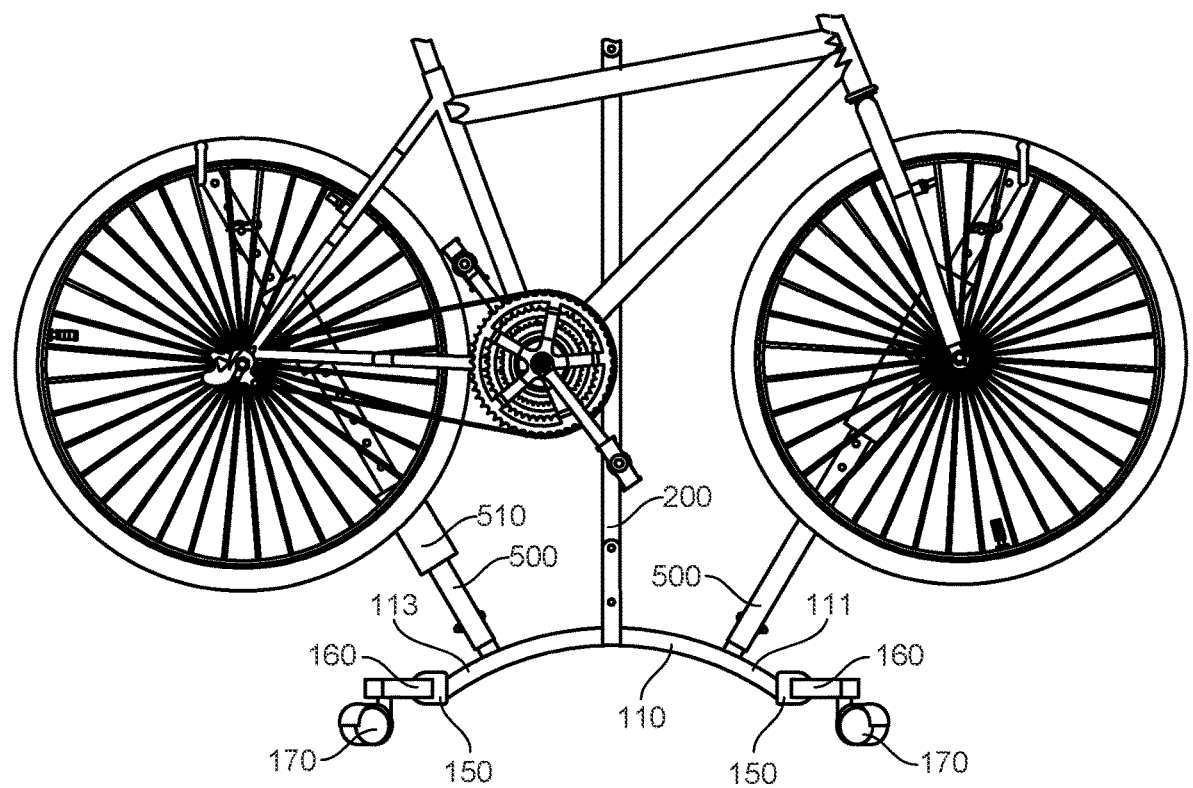
FIG. 12 is a view of storage stand with a single bicycle hanging from the cradles.
Figure 13:
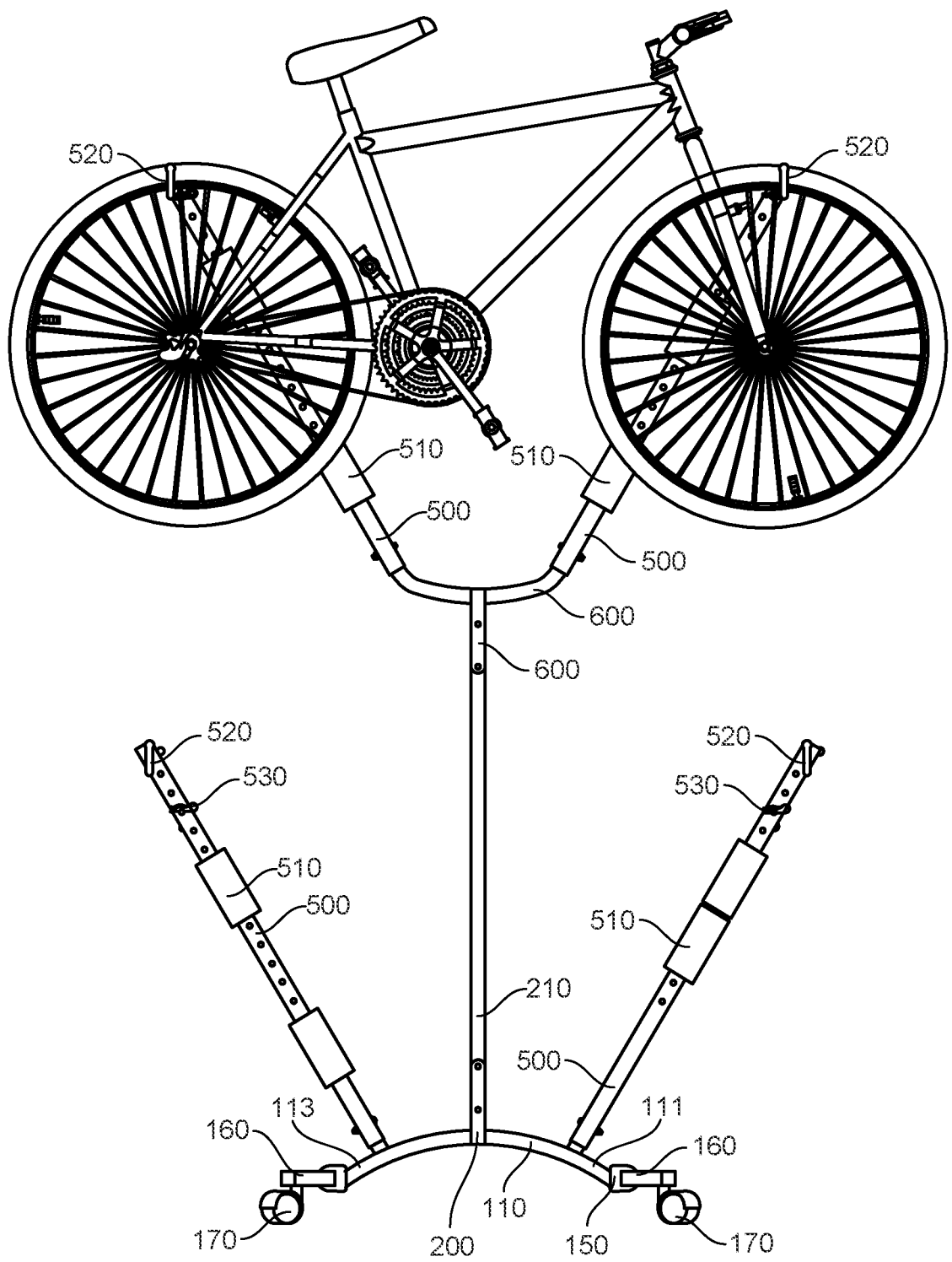
FIG. 13 is a view of storage stand with a bicycle hanging from the upper cradles.
Figure 14:
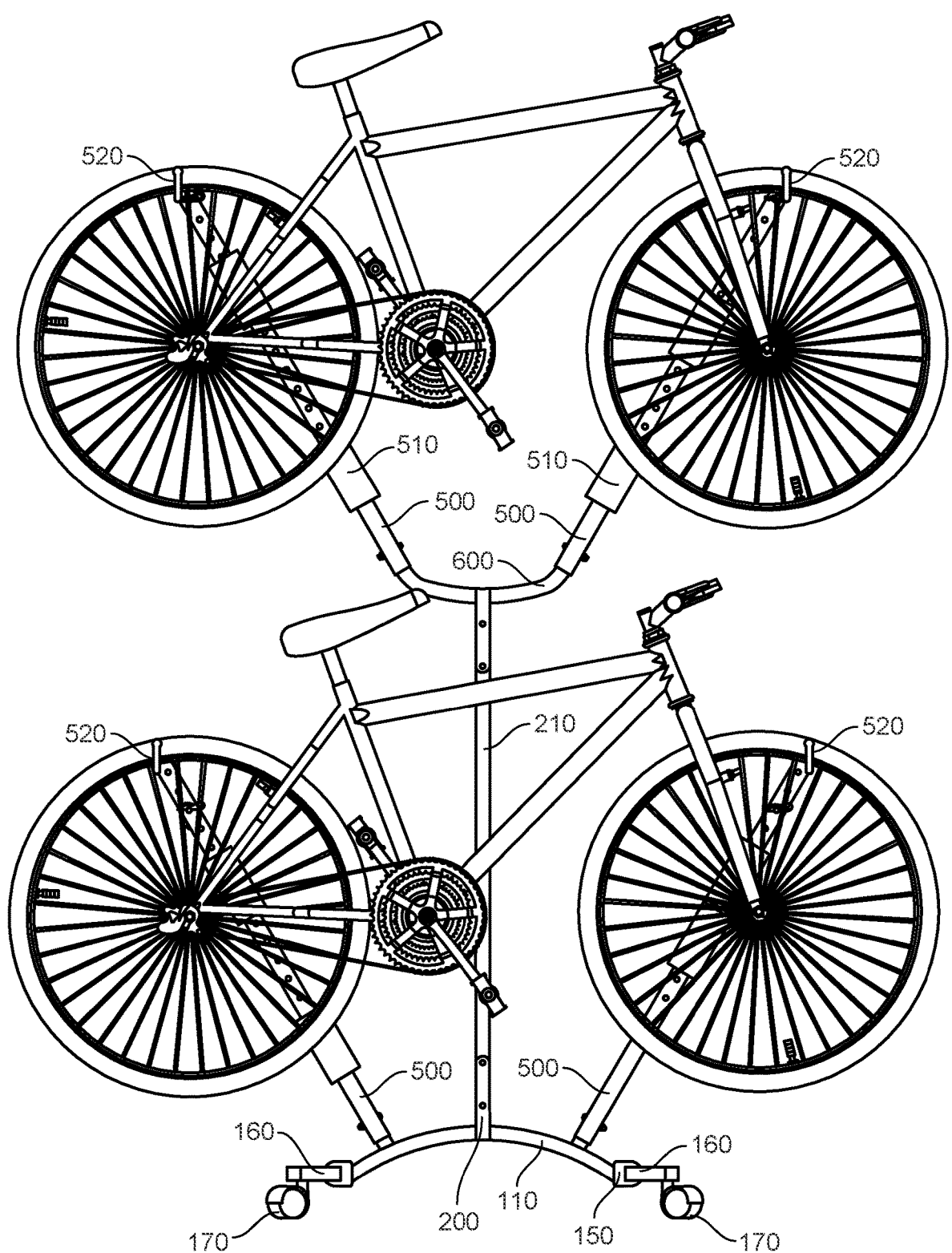
FIG. 14 is a view of storage stand with a single bicycle hanging from the cradles on the lower cradles and from the upper cradles.

The wings of the present invention ideally have a series of holes that run from one side to the other. These holes are clearly shown in FIG. 11. The holes serve as mounts for the payload carrying members 520. As shown in FIG. 11 these carrying members have a round end that is insertable through the holes and on one end of the member is a through hole. A pin, such as a cotter pin, is then inserted therethrough in order to secure the member 520 to the wing 500. In this configuration the payload carrying member is rotatable within the hole. It also allows for easy removal. In FIG. 11 the cargo carrying member is hook, however, it could be a ledge, a clamp, a wide clamp, or any other type of fastening or holding device. This easy removability makes it easy to have a wide variety of connectors that can be attached or removed with little effort. Ideally there are more than one of these payload carrying members 520 located on the wings 500 and because the holes are spaced along the length of the wing 500 the carrying members 520 likewise can be attached anywhere along the length of the wing 500. Ideally there are at least four of these members 520 attached at multiple locations along the wings 500 and because the holes extend all the way through the wings it is easy to affix the payload carrying members to either side of the wings 500 as is shown in FIGS. 5 and 11. This basic embodiment allows for holding one bicycle as is shown in FIG. 12, or two bicycles, one on each side of the wings 500. In the embodiment shown in FIG. 12 the wings are angled such that they hang the bicycle suspendedly by the top, inside of the wheels with the pedals and cranks offset to one side, allowing for another bike to be suspended on the opposite side without either bike touching the storage stand or the other bicycle. This is the preferred orientation because bicycle designs and frames have a plethora of designs and configurations but typically have the relatively same spacing between the wheels. It is easier to not have to adjust the wings to fit particular frames and to just hang bicycles by the wheels. It should be noted however, that when the wing receivers 130 are moveable they could be moved closer to the center of the base thus allowing the bicycle to be hung by the frame. This is time consuming and causes the need for greater adjustment and hence the wheel hanging method is preferred. Moreover, the bicycles hang square and true in this way, compared to off angled and slanted when hung from the frame.

Figure 3:
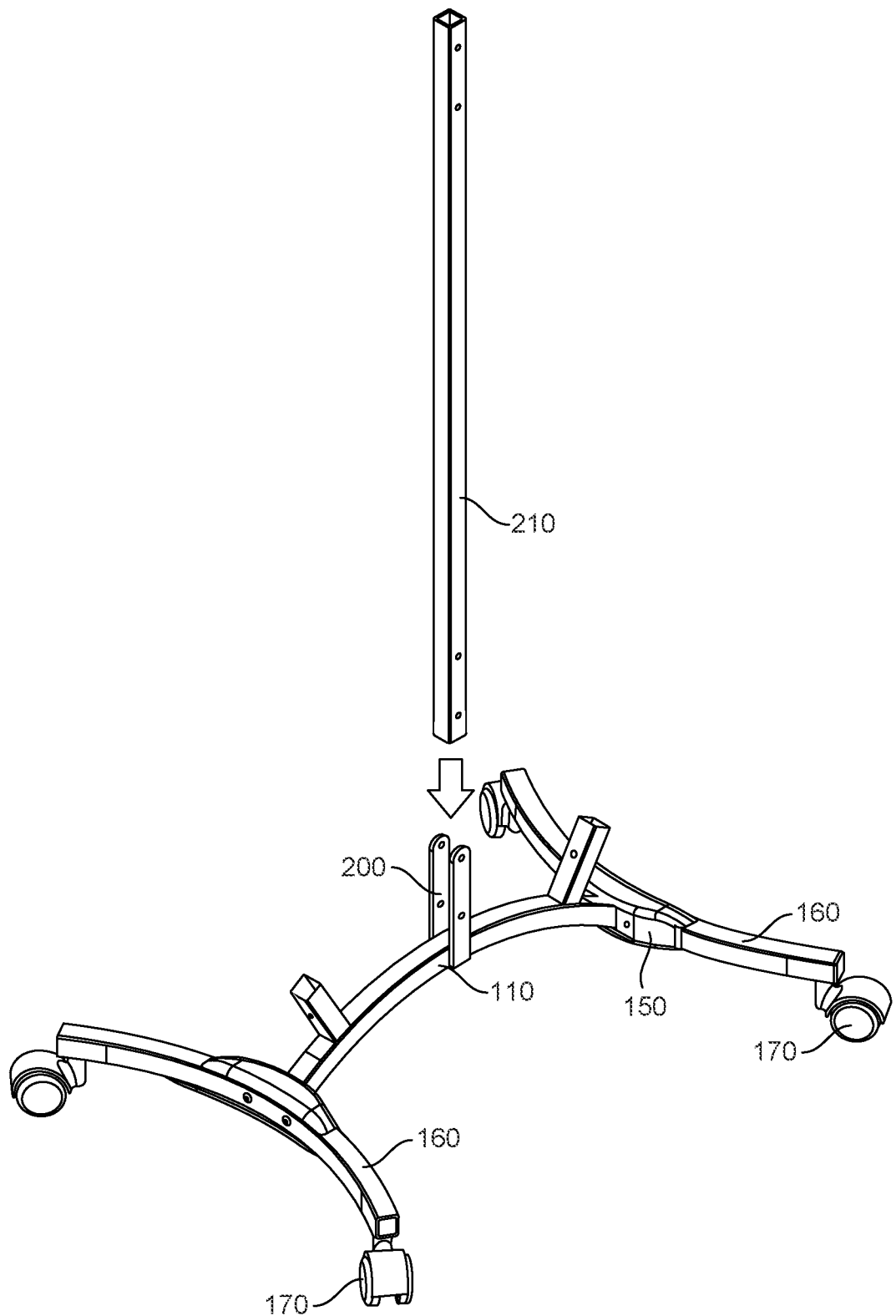
FIG. 3 is a elevated, partially exploded view showing the base and the mast tube.

A second embodiment builds off the base unit of the first embodiment to allow greater adjustability and storage expansion. FIGS. 1, 2, 3, 7, 8, 9, 10, 13, 14, 15, 16 and 17 show the different parts of this embodiment and will be explained in more detail. This second embodiment is a storage stand 10 having a base this is formed using a main tube 110 having a first end 111, a middle portion 112 and a second end 113; a first wing receiver 130 affixable to the main tube 110 between the main tube middle portion 112 and the first end 111 and a second wing receiver 130 affixable to the main tube 110 between the main tube middle portion 112 and the second end 113. Next there is a pair of outer stand tubes 160, each having a first end 175, a middle portion 190 and a second end 180; a pair of leg connectors 140 to connect the main tube first and second ends 111, 113 to the middle portions 190 of the pair of outer stand tubes 160; feet 170 located at each of the outer stand tubes first and second ends 175 and 180; a first wing 500 secureable to the first wing receiver 130 and a second wing 500 securable to the second wing receiver; and at least one payload carrying member 520 affixable to wings. This forms the base for this second embodiment and is generally similar to the first embodiment. This second embodiment however provides greater storage ability by adding a second layer of payload carrying members. This layer extends upwardly from the base unit. As shown in FIG. 3 there is a mast 210 having a first end 211 and a second end 212, a lower first mast attachment member 200 to the main tube middle portion 112 to the mast first end 211 and an upper tube 600 having a first end 610, a second end 620 and a middle section 630; a second mast attachment member 640 to connect the upper tube middle section 630 to the mast second end 212. Finally, there is an upper first wing that is secureable at the upper tube first end 610, an upper second wing secureable at the upper tube second end 620 and payload carrying members 520 that are removeably connectable at a number of points along the first and second wings.

Figure 1:
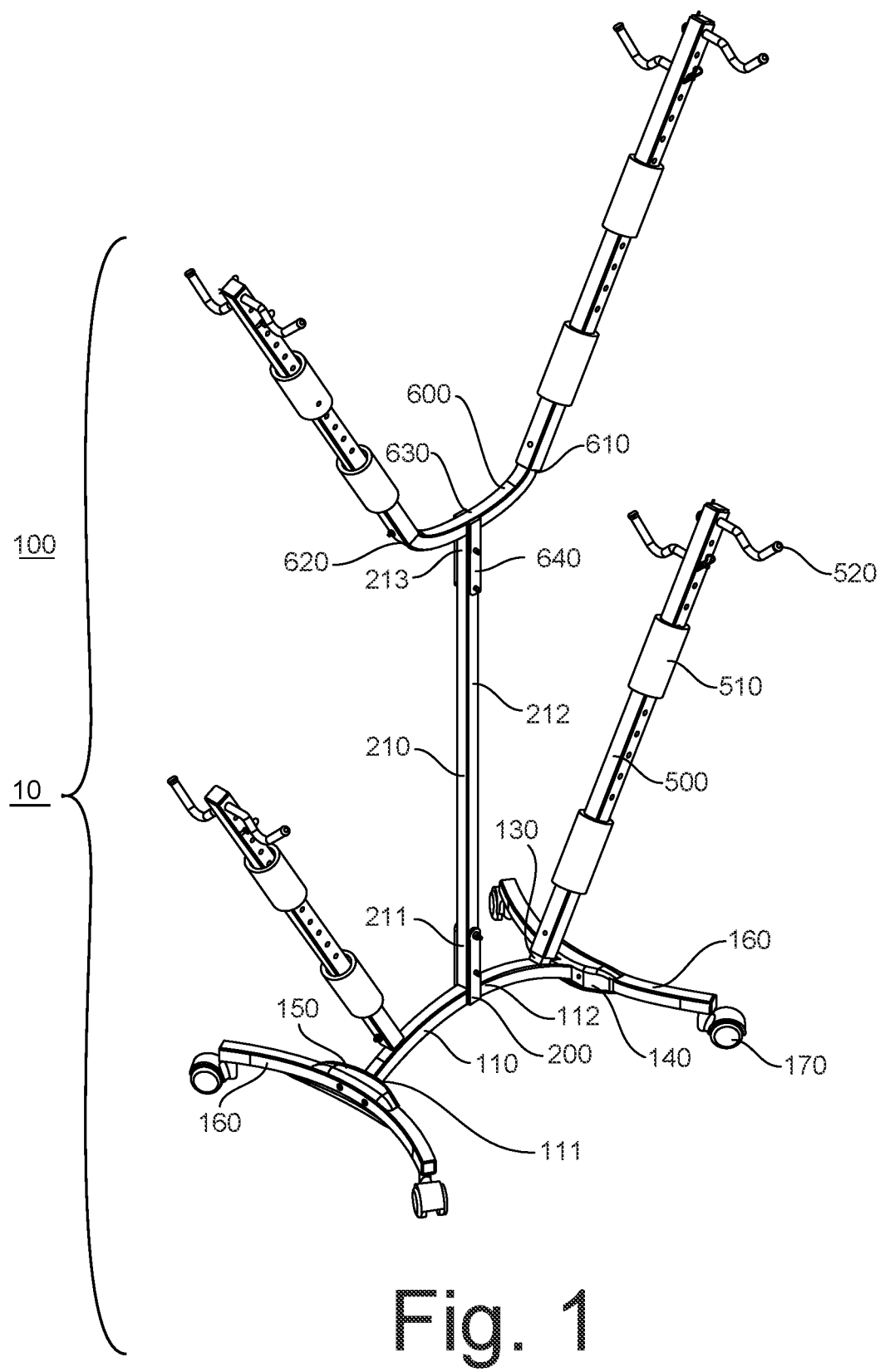
FIG. 1 is an elevated side view of an assembled embodiment of the present invention.
Figure 4:
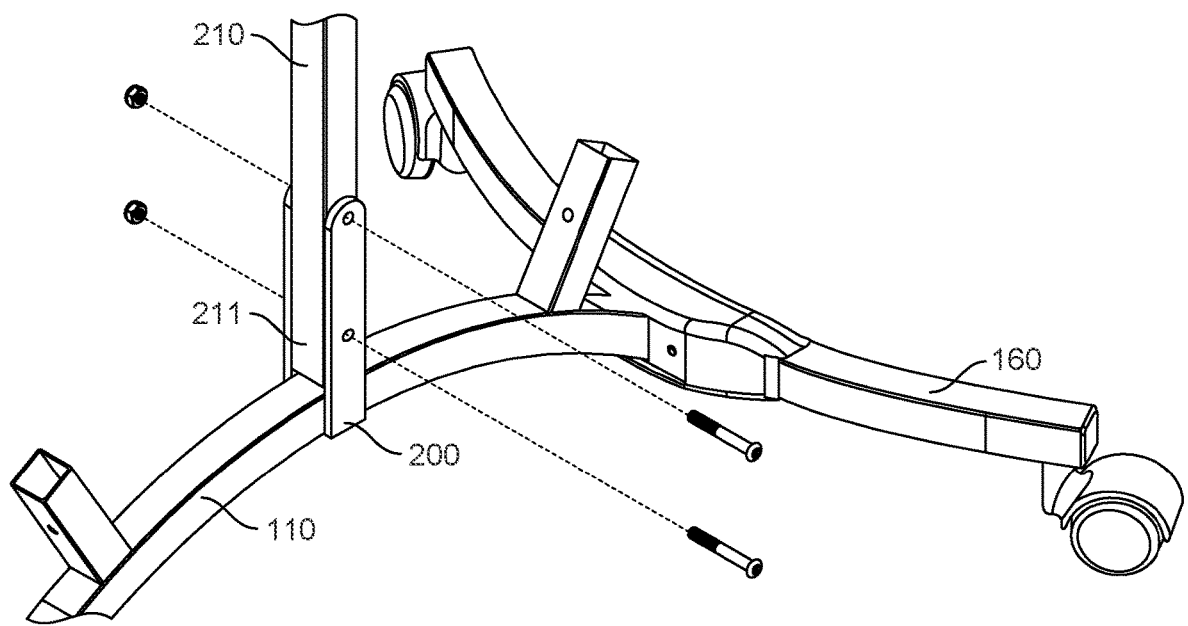
FIG. 4 is an elevated view of the base of the apparatus.

This second embodiment is shown in a number of FIGS. FIG. 1 shows the entire apparatus as assembled having the lower base unit and the upper riser unit with four wings attached thereto. FIG. 2 as described above shows an exploded view of the base unit. FIG. 3 shows the base unit with the first, lower mast tube attachment member 200. This attachment member as shown in this figure is two separate plates attached to opposite sides of the main tube 110. These plates can be permanently affixed or removeably affixed to the main tube. The mast 210 is sized to fit snugly between the mast tube attachment member 200 plates and in this embodiment is secured to the attachment member 200 with bolts that are run through two mating holes in the mast 210 and the attachment member 200. FIG. 4 shows how the mast is attached using fasteners such as a bolt with nuts. However, the mast 210 could be attached using screws or other attachment means. Alternatively, the mast 210 could be permanently affixed to the mast tube attachment member 200 by weld or other permanent means. It could also be possible to have this mast 210 be formed and made an integral part of the main base tube 110. FIG. 4 shows how the mast is attached using fasteners such as a bolt with nuts.

Figure 7:
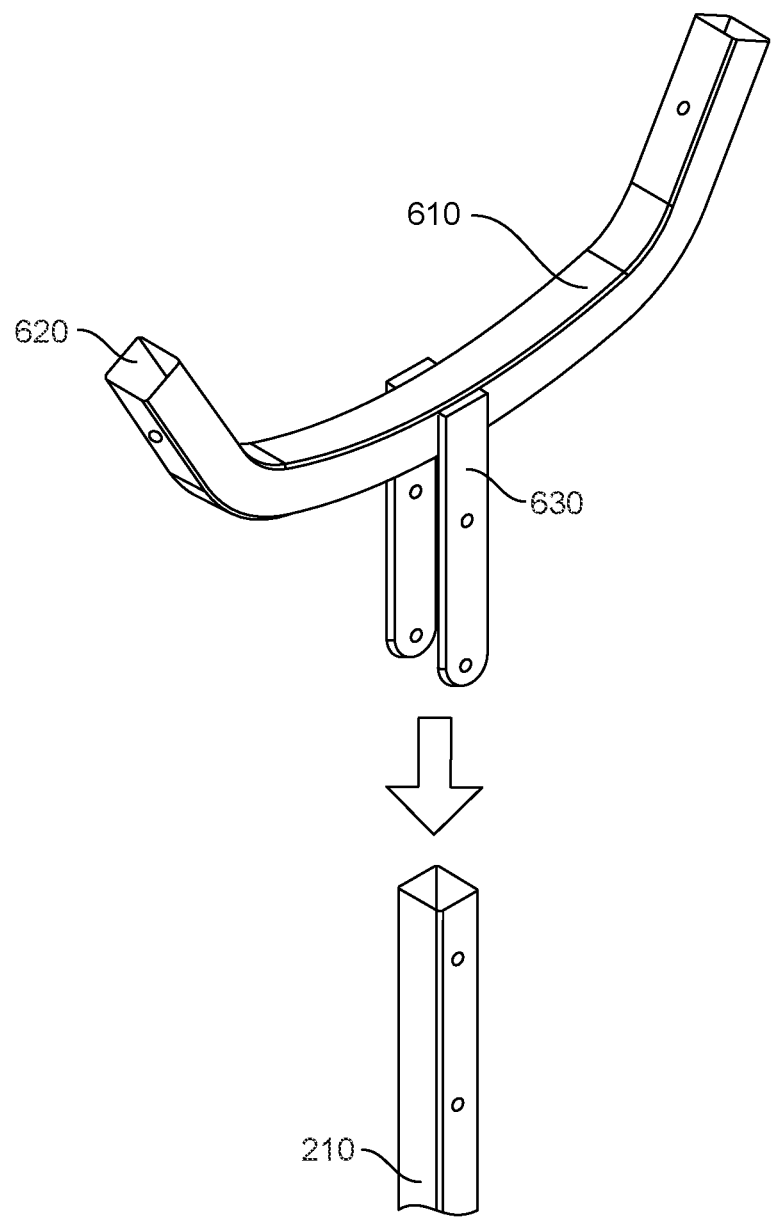
FIG. 7 is a partially exploded view of the top of the storage stand.
Figure 8:
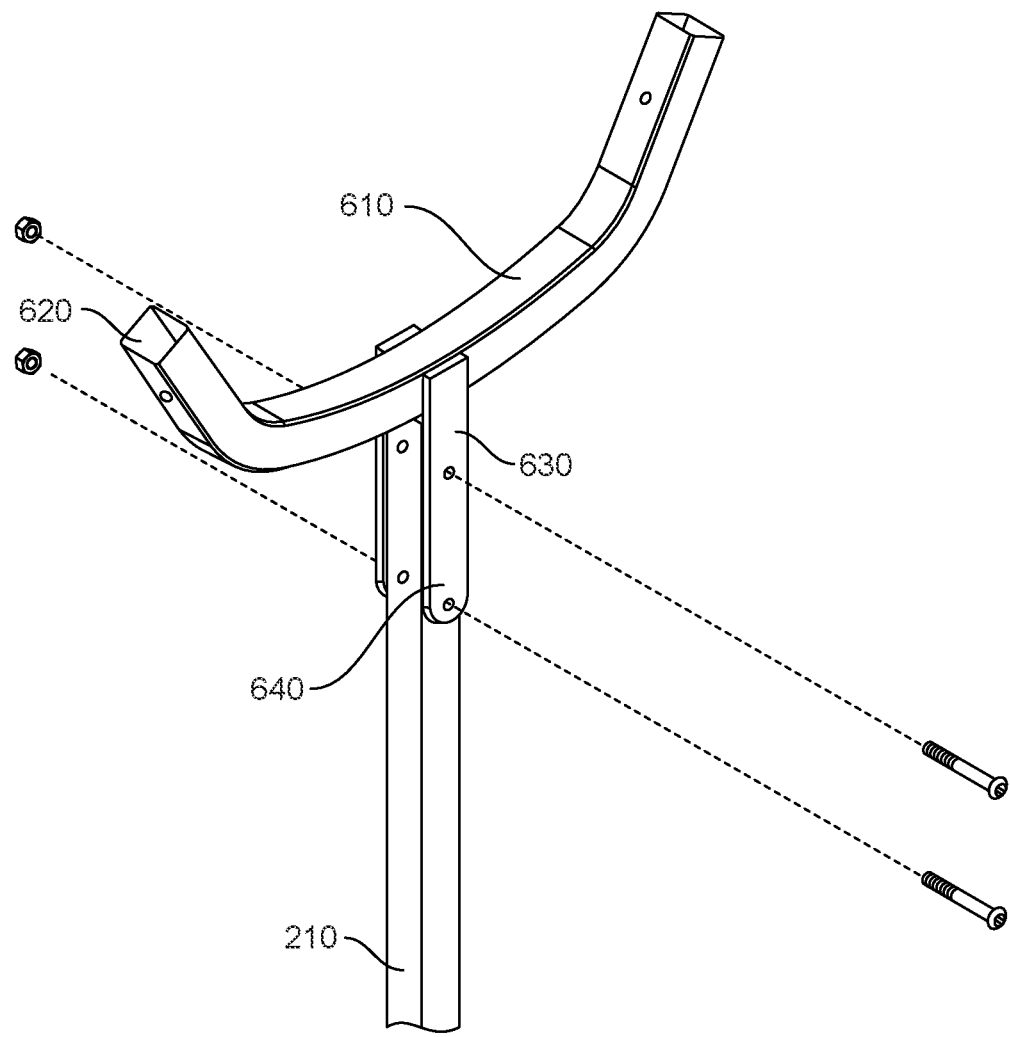
FIG. 8 is a view of the top of the storage stand prior to fastener installation.
Figure 9:
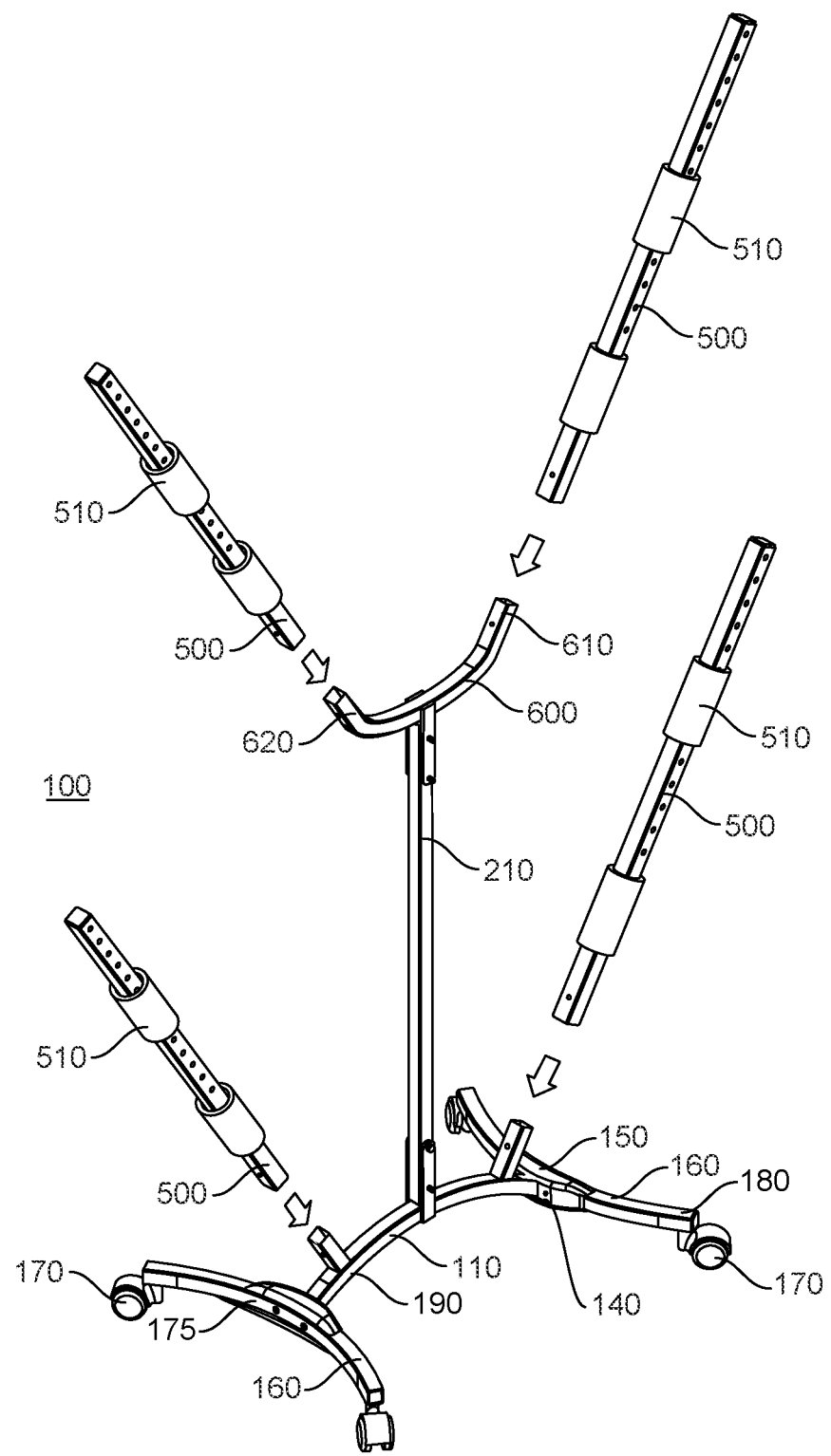
FIG. 9 is an elevated partially exploded view of the storage stand showing the wings prior to attachment.
Figure 10:
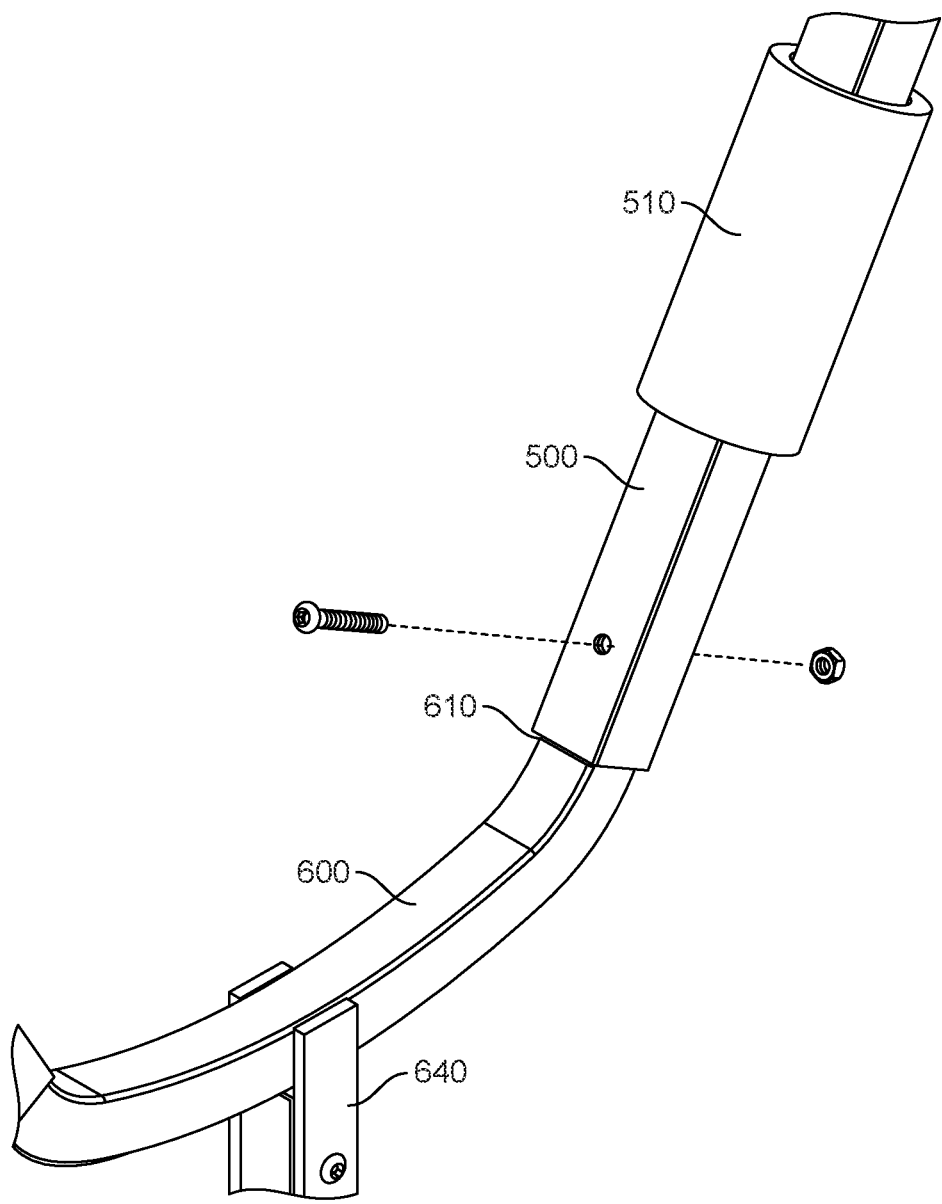
FIG. 10 is a close up of the upper u-tube where the wings attach.

FIG. 7 shows how the upper member connects to the mast. As noted above, this second embodiment provides much greater storage ability by adding the second layer of payload carrying members. This layer extends upwardly from the base unit. As shown in FIG. 3 the mast first end 211 is connected to the lower first mast attachment member 200 at the main tube middle portion 112. FIGS. 7 and 8 show the upper tube 600 having the first end 610, the second end 620 and the middle section 630 and the second mast attachment member 640 ready to connect to the upper tube middle section 630 to the mast second end 212. As can be seen in FIGS. 9 and 10, the upper tube 600 has the first end and the second end and at each end the upper wings are secured. FIG. 9 shows the first wing that is secureable at the upper tube first end 610, and the upper second wing secureable at the upper tube second end 620 prior to attachment and FIG. 10 shows one of the wings after attachment and prior to bolt insertion and securement. FIG. 11 shows how the payload carrying members 520 are attached to the wings and also shows that they are removably connectable at a number of points along the wings. This easy adjustability provides a wide range of configurations, both in positioning and the type of payload carrying members that may be used.

As can be seen in FIGS. 1, 7-10 and 13-17 it is preferable to have the upper tube first end and second end bend upwardly away from the upper tube middle section. Obviously, it is possible to connect the wings at the ends and then have the wings bend but in this embodiment it is preferable to have the upper tube as the bent member.

As in the previous description it is possible to have adjustable leg connectors. It is possible to have casters as the feet to provide easy movability. And it is possible to have the wing receivers adjustable along the main tube. This is clearly described above and thus will not be described again at this point.

Figure 15:
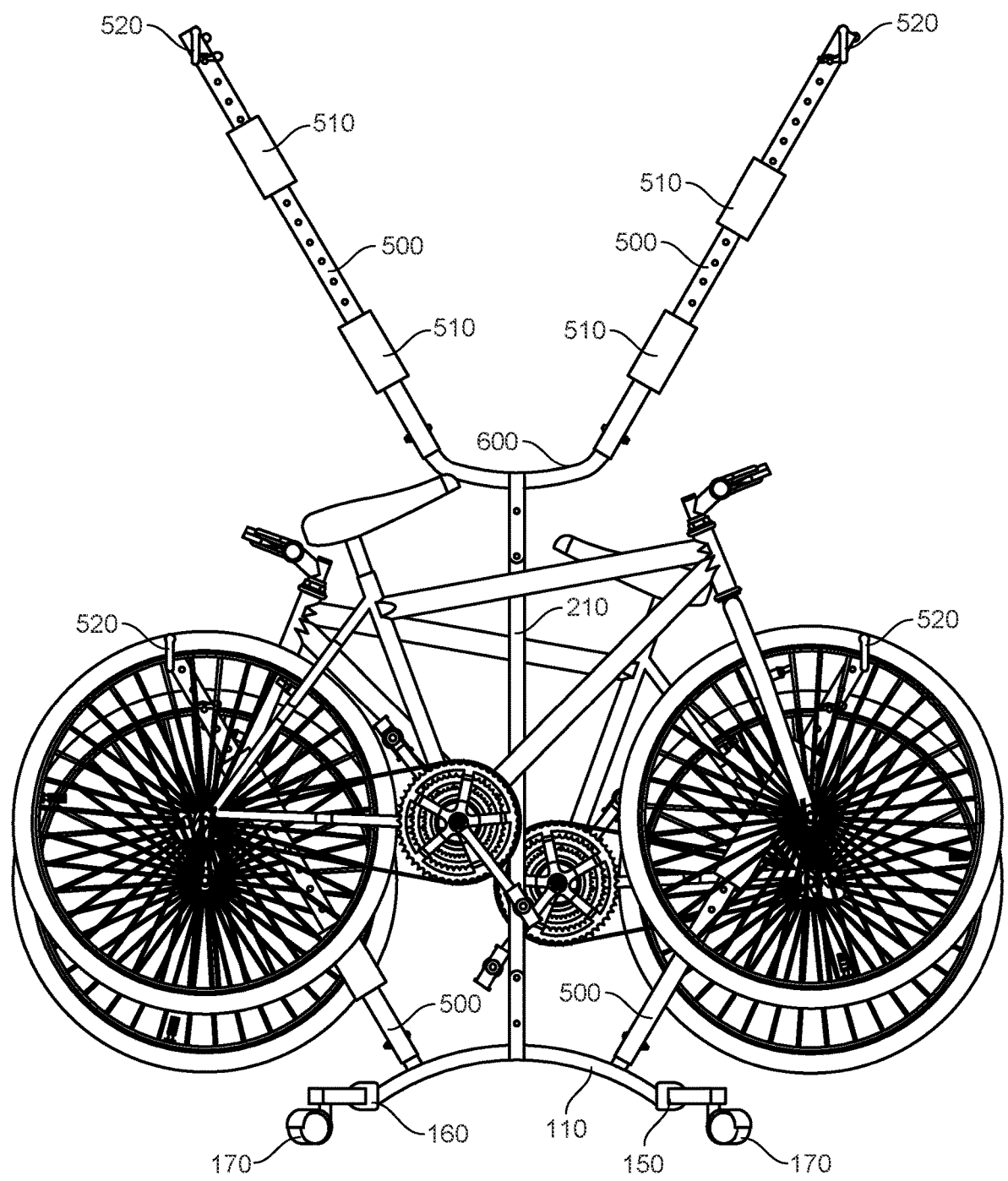
FIG. 15 is a view of storage stand with two bicycles hanging from the lower cradles located on opposite sides of the storage stand.
Figure 16:
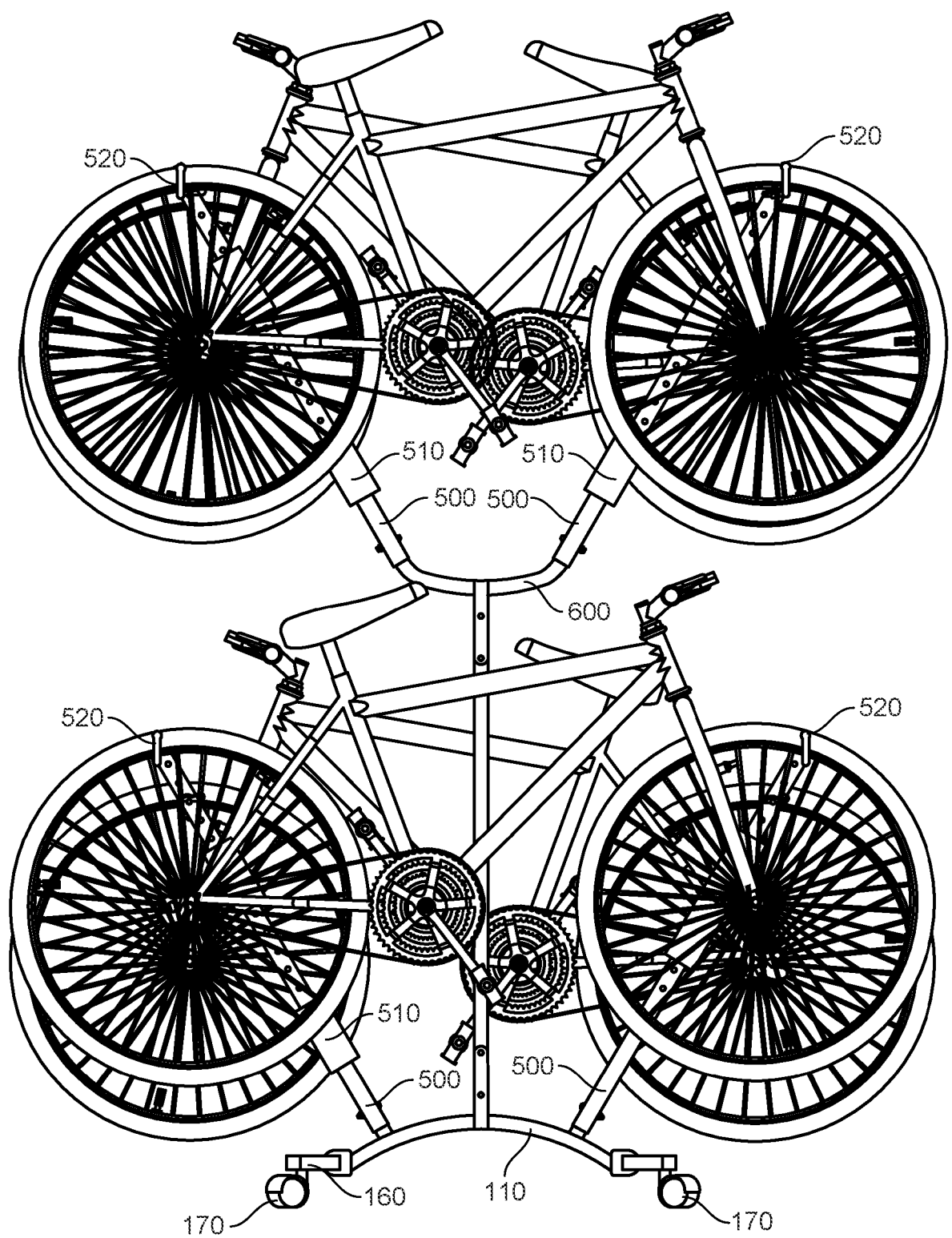
FIG. 16 is a view of storage stand with two bicycles hanging from the upper cradles on opposite sides of the stand and two bicycles hanging from the lower cradles located on opposite sides of the storage stand.
Figure 17:
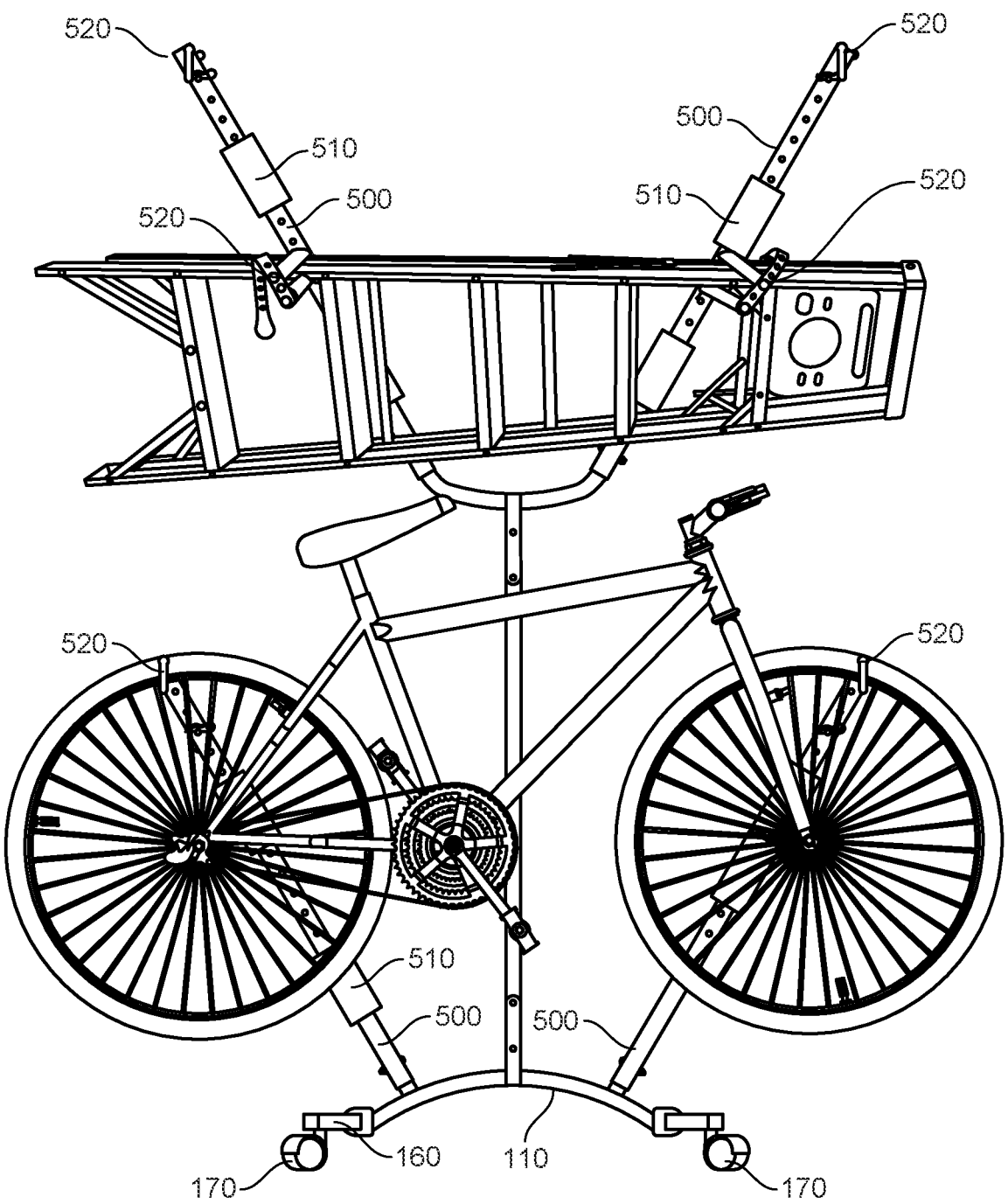
FIG. 17 is a view of the storage stand with a bicycle hanging from the lower cradles and a ladder hanging from the upper cradles.

Also as above, it is possible to have multiple payload carrying members 520 connectable at a number of locations along the wings. In the first embodiment these members 520 are connectable the lower wings. In this second embodiment it is possible to have these members 520 connectable along both the lower and upper wings. Again, this provides for and allows for a wide range of configurability and adjustability. It provides the ability to have a wide number of different types of connectors to secure a wide variety of payloads. It is also preferable that these connectors 520 be removeably connectable to both sides of the wings. This is clearly shown in FIG. 1 and FIG. 11 and is also shown in FIG. 15, 16.

A final embodiment will be described next. In this final embodiment, shown in all the Figures, there is a storage stand 10 having a base 100 where the base has a curved main tube 110 having a first end 111, a middle portion 112 and a second end 113; at least two wing receivers 130 affixable to the curved main tube 110, one each near the curved main tube first and second ends 111, 113; a pair of outer curved stand tubes 160, each having a first end 175, a middle portion 190 and a second end 180; a pair of leg connectors 140 to connect the main tube first and second ends 111, 113 to the middle portions 190 of the pair of outer stand tubes 160, and feet 170 located at each of the outer stand tubes first and second ends 175, 180. This forms the base unit for this embodiment and then there is a wing 500 secureable to each of the two wing receivers 130 and at least one payload carrying member 520 removeably secureable to the wings 500.

In this embodiment the wings extend angularly upward and outward from the curved main tube middle portion 112. The reason for this angular configuration is directly related to the curved shape of the main tube. The receivers in this embodiment are basically square receivers with a flat bottom that connects directly to the curved main tube. The curve causes the receivers to not be planar but rather, angular. If the main tube were flat then the receivers would have to be angular to arrive at the desired effect of having the wings extend outwardly at an angle. Although possible, it is more difficult to manufacture the angled receivers than to manufacture a curved main tube identical to each leg tube so all three curved tubes are the same, and thus less costly. This curved configuration provides easy receiver attachment and provides the required angle for the wings 500.

Figure 18:
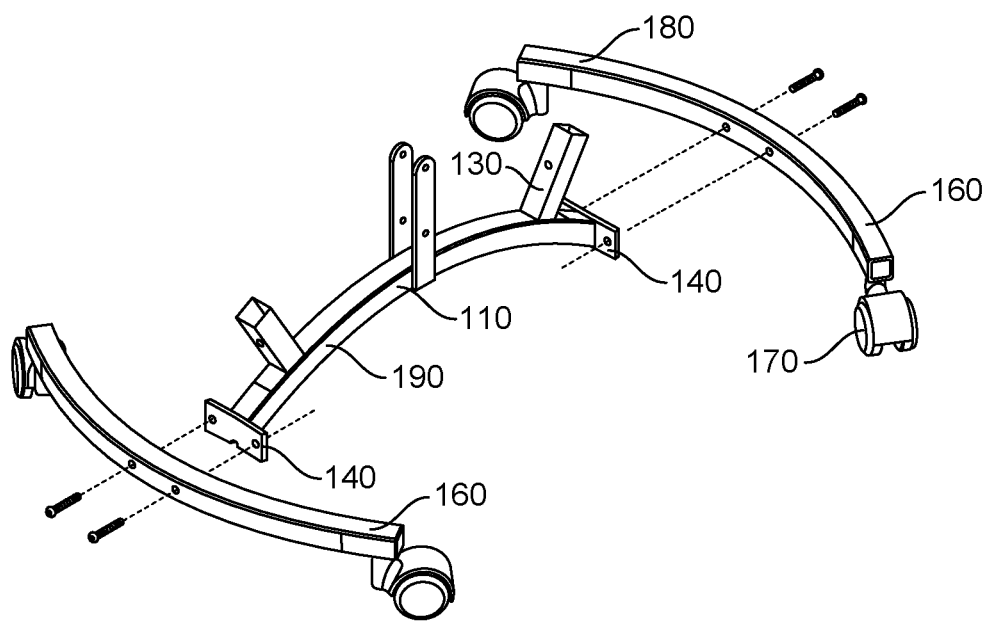
FIG. 18 is an elevated, exploded view of the storage stand with the curved legs unattached.
Figure 19:
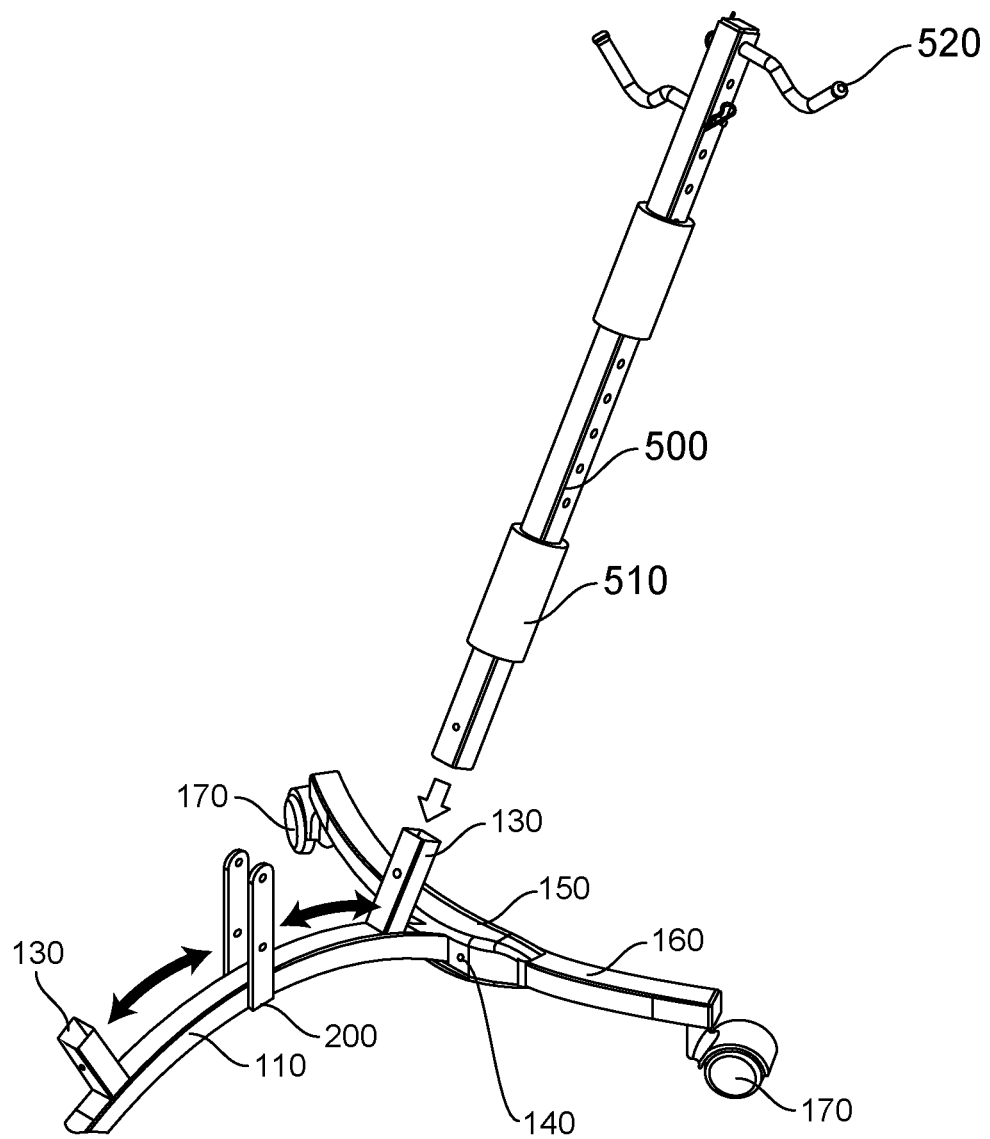
FIG. 19 is a close up elevated view of one side of the base with the wing in position for connection to the wing receiver.

In addition to this curved main tube it is preferred to have the outer stand tubes be curved as well. The curve, as shown in FIGS. 1-6, 9, and 18 is preferred because it creates a larger footprint for the feet thus making the stand more solid and grounded. It is possible to have these stand tubes be straight, but it would not provide the same footprint and would not be as stable as the preferred configuration. FIG. 18 shows the outer stand tubes disconnected from the base with the connecting members visible. In addition, the leg tubes can be selectively reversed to provide a narrow or wide track base. In other words, rather than curving outwardly as shown in FIGS. 1-6 and 9, the outer stand tubes would be turned around so that they are curving inwardly, as shown in FIG. 18, thus creating the narrower track base.

Also, it is preferred to have the at least one payload carrying member be more than one and that they be connectable at a number of locations along the angled wings. As noted above, having a multitude of payload carrying members 520 provides the ability to hold, support and store a larger number and variety of payloads and items. The adjustability along the wings increases the usefulness by providing numerous configurations that are easily obtainable simply by moving the carrying members 520 along the wings. It is also preferred that these members 520 be removeably connectable to one or both sides of the angled wings 500. Again, this allows for greater configurability and usefulness.

As shown in FIGS. 1, 9 and 13-17 it is possible and beneficial to add an extra set of wings above the first set. In this modified embodiment the storage stand described above also has a mast 210 having a first end 211 and a second end 212; a first mast attachment member 200 to connect the middle portion 112 of the curved main tube to the mast first end 211; an upper tube 600 having a first end 610, a second end 620 and a middle section 630; a second mast attachment member 640 designed to connect the upper tube middle section 630 and the mast second end 212; an upper first wing 500 secureable to the upper tube first end 610; an upper second wing 500 secureable to the upper tube second end 620; and payload connection members 520 removeably connectable at a number of points along the first and the second wings 500.

This embodiment is generally the same as the first two embodiments with the exception of the main tube 110 being a curved configuration and the outer stand tubes also being a curved configuration. These differences, although minor, add manufacturing ease, they simply create the V-shaped configuration and they generally create a larger, wider base footprint that provides a more stable and solid base without adding material or costs to the final product.

Two final differences incorporated into this last embodiment are first that the upper tube first end and second end bend upwardly away from the upper tube middle section thereby forming a U shape. As above, this U shape allows for the wings to be straight members that are then inserted into the ends thereby extending the ends. After insertion the wings now for a wide V shape. This provides all the benefits described above. Finally, it is preferable to have padding 510 incorporated with the wings somehow. This padding 510 can be simple padded sleeves that slide over the wings, it could be padding 510 that is incorporated into the wings during manufacturing, it could be adhesive padded stickers that are applied by a user or any other type of padding 510. The goal is to protect whatever is hung by the connection members 520. For example, if a user hangs an expensive bicycle from the connection members 520 he would not want it scratched by the wings so by providing padding 510 the payloads are protected from scratching and marring.

The advantages of the present invention include, without limitation, that it is stable, mobile and adaptable such that it fits and stores a wide variety of tools, sporting goods and bicycles in a compact floor footprint using the vertical dimension above the base as a novel equipment column that is efficient, mobile and compact, and does not require any attachment to a wall.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by Letters Patent includes the following:

What is claimed:

1. A storage stand comprising:
   a base comprising;
   a main tube having a first end, a curved middle portion and a second end;
   a first wing receiver affixable to said main tube between said middle portion and said first end;
   a second wing receiver affixable to said main tube between said middle portion and said second end;
   a pair of outer stand tubes, each having a first end, a middle portion and a second end;
   a pair of leg connectors to connect said main tube first and second ends to said middle portions of said pair of outer stand tubes; and
   feet located at each of said outer stand tubes first and second ends;
   a first wing secureable to said first wing receiver;
   a second wing secureable to said second wing receiver; and
   at least one payload carrying member affixable to at least one of said first wing or said second wing.

2. The storage stand of claim 1 where said leg connectors are adjustable.

3. The storage stand of claim 1 where said first and said second wing receivers are adjustable along said main tube.

4. The storage stand of claim 1 where said at least one payload carrying member is more than one and where they are connectable at a number of locations along said wing.

5. The storage stand of claim 4 where said multiple payload carrying members are removeably connectable to one or both sides of said wings.

6. The storage stand of claim 5 where said main tube curved middle portion is curved upwardly from said first and second ends with a crest of said curve at said middle portion and where each of said first and said second wings extend outwardly at a slight angle away from said middle portion of said main tube.

7. The storage stand of claim 5 where said outer stand tubes are curved so that they are reversibly connectable to said main tube creating either a narrow or wide track base configuration.

8. A storage stand comprising:
   a base comprising;
   a main tube having a first end, a middle portion and a second end;
   a first wing receiver affixable to said main tube between said main tube middle portion and said first end;
   a second wing receiver affixable to said main tube between said main tube middle portion and said second end;
   a pair of outer stand tubes, each having a first end, a middle portion and a second end;
   a pair of leg connectors to connect said main tube first and second ends to said middle portions of said pair of outer stand tubes;
   feet located at each of said outer stand tubes first and second ends;
   a first wing secureable to said first wing receiver;
   a second wing secureable to said second wing receiver; and
   at least one payload carrying member affixable to said first wing;
   at least one second payload carrying member affixable to said second wing;
   a mast having a first end and a second end;
   a first mast attachment member to connect said main tube middle portion to said mast first end;
   an upper tube having a first end, a second end and a middle section;
   a second mast attachment member to connect said upper tube middle section and said mast second end;
   an upper first wing secureable at said upper tube first end;
   an upper second wing secureable at said upper tube second end; and
   said at least one payload carrying member and said at least one second payload carrying member affixable to said first and said second wing are removeably connectable at a number of points along said first and said second wings.

9. The storage stand of claim 8 where said upper tube first end and second end bend upwardly away from said upper tube middle section.

10. The storage stand of claim 9 where said leg connectors are adjustable.

11. The storage stand of claim 10 where said feet are casters.

12. The storage stand of claim 11 where said at wing receivers are adjustable along said main tube.

13. The storage stand of claim 12 where said at least one payload carrying member and said at least one second payload carrying member is more than one and where these said members are connectable at a number of locations along said wings.

14. The storage stand of claim 13 where said payload carrying members and said second payload carrying members are removeably connectable to one or both sides of said wings.

15. A storage stand comprising:
a base comprising;
a curved main tube having a first end, a middle portion and a second end;
a first wing receiver affixable to said curved main tube;
a second wing receiver affixable to said curved main tube;
a pair of outer stand tubes, each having a first end, a middle portion and a second end;
a pair of stand tube connectors to connect said main tube first and second ends to said middle portions of said pair of outer stand tubes;
feet located at each of said outer stand tubes first and second ends;
a first wing secureable to said first wing receiver;
a second wing securable to said second wing receiver; where
each of said first wing and said second wing extend angularly upward and outwardly from said curved main tube middle portion; and
at least one payload carrying member removeably secureable to each of said first and said second wings.

16. The storage stand of claim 15 where said pair of outer stand tubes are curved so that if said stand tubes curve inward toward said main tube they create a narrow footprint and if said stand tubes curve outward, away from said main tube, they create a wide footprint.

17. The storage stand of claim 16 where said at least one payload carrying member is more than one and where they are connectable at a number of locations along said angled wings.

18. The storage stand of claim 17 where said more than one payload carrying members are removeably connectable to one or both sides of said angled wings.

19. The storage stand of claim 18 further comprising:
a mast having a first end and a second end;
a first mast attachment member to connect said middle portion of said curved main tube to said mast first end;
an upper tube having a first end, a second end and a middle section;
a second mast attachment member to connect said upper tube middle section and said mast second end;
an upper first wing secureable to said upper tube first end;
an upper second wing secureable to said upper tube second end; and
payload connection members removeably connectable at a number of points along said first and said second wings.

20. The storage stand of claim 19 where:
said upper tube first end and second end bend upwardly away from said upper tube middle section thereby forming a U shape; and
where said wings are padded.

* * * * *